UNITED STATES PATENT OFFICE.

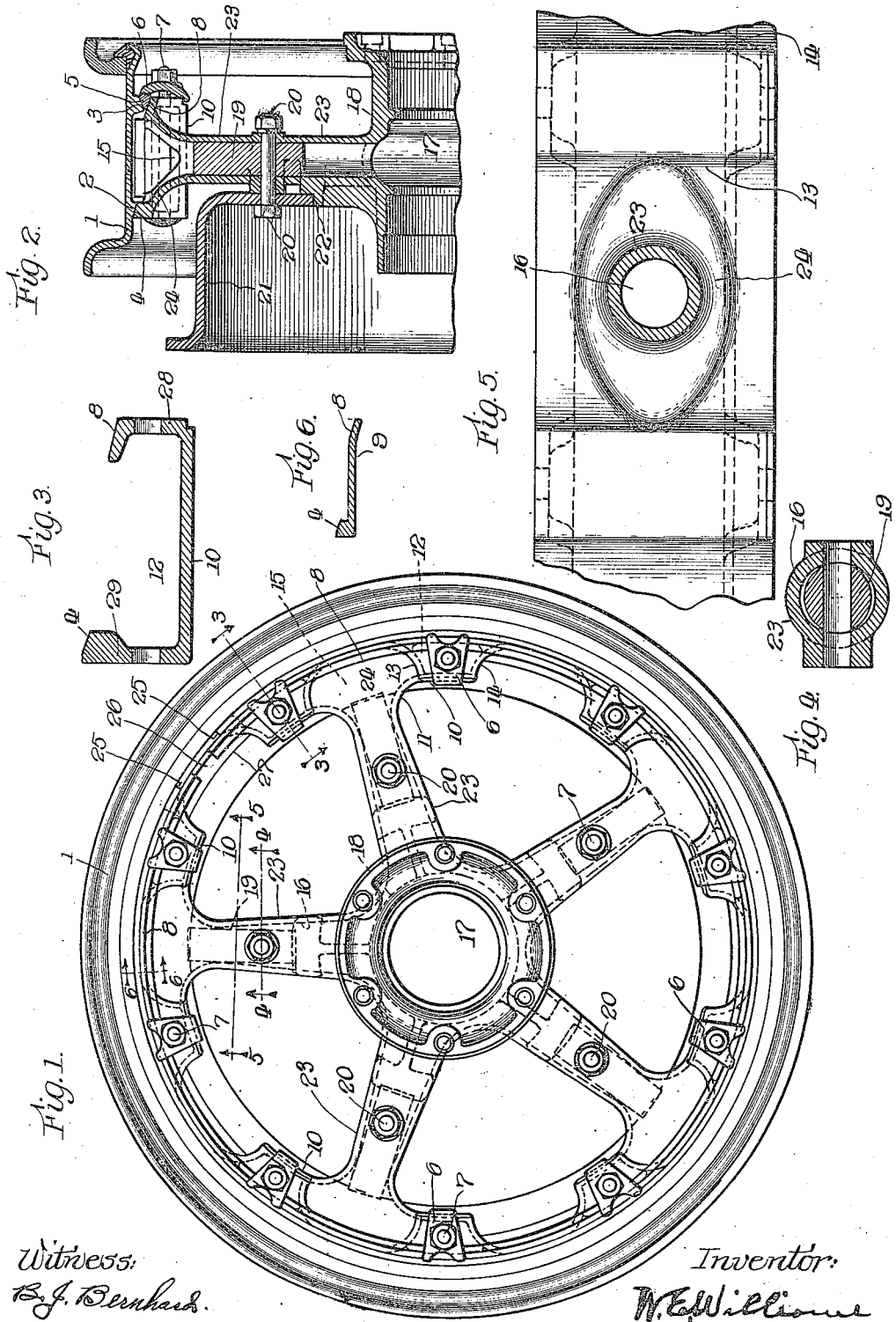
W. E. WILLIAMS.
CAST WHEEL FOR AUTOMOBILES.
APPLICATION FILED JULY 9, 1920.
1,421,643. Patented July 4, 1922.
Witness:
B. J. Bernhard.
Inventor:
W. E. Williams

WILLIAM ERASTUS WILLIAMS, OF CHICAGO, ILLINOIS.

CAST WHEEL FOR AUTOMOBILES.

1,421,643.   Specification of Letters Patent.   Patented July 4, 1922.

Application filed July 9, 1920. Serial No. 394,996.

*To all whom it may concern:*

Be it known that I, WILLIAM ERASTUS WILLIAMS, a citizen of the United States, a resident of Chicago, in the county of Cook and State of Illinois, have invented a new and useful Improvement in Cast Wheels for Automobiles, of which the following is a specification.

My invention relates to wheels that are used for automobiles generally and particularly to the type of wheel required for demountable rim pneumatic tire equipment.

The object of my invention is to produce a demountable rim wheel having unusual strength for its weight.

Reference will be had to the accompanying drawing in which Figure 1 is a front elevation of the wheel.

Figure 2 is a side sectional elevation of a part of the wheel.

Figure 3 shows on a larger scale a transverse section of a rim portion on line 3—3 of Figure 1.

Figure 4 is a section of one of the spokes on line 4—4 of Figure 1.

Figure 5 is a sectional view of one of the spokes on the line 5—5 of Figure 1, looking in the direction of the arrows.

Figure 6 is a cross section on line 6—6 of Figure 1 but on a smaller scale than that of Figure 3.

The drawings indicate a rear wheel assembly.

In the drawing 1 indicates a demountable rim of large size required in truck service. This rim is what is known as the quick detachable type of a standard pattern well known at the present time in service. This rim is provided with annular bearing surfaces 2 and 3 which make the contact faces in connection with the wheel. The face 2 bears against a face bearing 4 of the rim of my wheel and the face 3 bears upon a wedge ring 5 which is of standard construction and held in place by a series of clamping clips 6 secured by bolts 7 in the ordinary manner. A finished surface 8 on the rim of my wheel furnishes the bearing seat for the wedge ring 6. Thus far the constructions are standard constructions heretofore used.

The surfaces 4 and 8 of my wheel as I have above stated are continuous surfaces around the rim of the wheel and they are connected across by a web portion or felloe portion indicated by 9 in Figure 6. This connecting felloe portion 9 extends only for a little distance midway between the spokes and it merges down into the felloe simulating portion 10 of Figure 3 and from this portion it is merged in two directions, one in a curved form 11 which joins the spokes, and the other is stepped outward on to the rim formations of 4 and 8, immediately at the spoke ends. Thus there is formed a sort of an open pocket or cavity 12 in the region where the bolts 7 and clips 6 are fastened in the wheel. This cavity 12, has side walls 13 and 14 that serve to resist the thrust or compression strains of the bolt 7.

The spokes are hollow, have bell shaped outer ends, and their internal cavities continuous with cavities 15, Figs. 1 and 2. The outer portions of the bell ends are narrower than that portion of the rim which rests upon the faces 4, 8, and shoulders 13, 14 are formed near the ends of the spokes. The axial passages in the spokes are continuous with an annular passage 17 in the hub 18. In these passages are fitted blocks 19 of wood or other suitable material, held in place by bolts 20 which secure in place a brake drum 21 resting against shoulders 22 of the spokes 23, the bell ends of which are designated in Fig. 5 by 24.

The blocks which lock the demountable rim against rotary travel are indicated by 25 and 26 indicates a slot in the rim which permits the entrance of the air valve for the pneumatic tire. An extra portion of metal is cast on to the back side of the rim as indicated by 27 for the purpose of compensating the weakening occasioned by the slot 26.

The arrangement of my rim as described provides for the least metal that will do the service and at the same time provides for the bolt and clip structures ordinarily employed on a wooden wheel, permitting this wheel to be used as standard equipment in place of wood whenever desired and used with the same fastenings.

The transverse rim portions 13, 14, add stiffness and allow making the side walls 28, 29, Fig. 3, very thin and hence desirably light.

What I claim is:—

1. In a wheel of the class described, a tread portion reduced to a thin section between the bolt fastenings and deepened to simulate the outer portion of a felloe where the demountable clips and bolts are located.

2. In a wheel of the class described, a series of spokes cast integral with the rim having bell or open mouthed ends joining the rim and having enlarged or widened shoulders on each side of the spokes adapted to simulate the surface of a wooden felloe wheel at the points where the demountable clips are located.

3. The combination with a flat rim-receiving felloe member carried inward at intervals to form peripheral recesses, of spokes terminally secured on each side to the adjacent inwardly carried portions of the felloe.

4. The combination with a flat felloe adapted to receive a demountable rim, and carried inward at intervals to form peripheral recesses, of spokes secured on each side to the adjacent inwardly carried portions which on each side of each spoke simulate portions of a wood felloe.

5. A wheel of the class described, a flat felloe provided at its lateral margins with inclined peripheral bearing surfaces for a demountable rim and provided with in-bent portions at regular intervals, spokes fixed to the in-bent portions and means between the spokes for securing a demountable rim in place.

Signed at Chicago, in the county of Cook and State of Illinois, this third day of June, 1920.

WILLIAM ERASTUS WILLIAMS.

Witnesses:
B. J. BERNHARD,
F. M. ZOBEL.